(12) United States Patent
Azuchi et al.

(10) Patent No.: US 6,540,276 B2
(45) Date of Patent: Apr. 1, 2003

(54) BUMPER REINFORCEMENT STRUCTURE

(75) Inventors: Kazunari Azuchi, Himi (JP); Kazunobu Nuno, Toyota (JP)

(73) Assignees: Aisin Seiki Kabushiki Kaisha, Kariya (JP); Aisin Keikinzoku Kabushiki Kaisha, Shinminato (JP)

( * ) Notice: Subject to any disclaimer, the term of this patent is extended or adjusted under 35 U.S.C. 154(b) by 0 days.

(21) Appl. No.: 09/851,959

(22) Filed: May 10, 2001

(65) Prior Publication Data

US 2002/0053805 A1 May 9, 2002

(30) Foreign Application Priority Data

Nov. 9, 2000 (JP) .................................... 2000-342314

(51) Int. Cl.⁷ .............................................. B60R 19/18
(52) U.S. Cl. ...................................... 293/102; 293/120
(58) Field of Search ................................. 293/102, 107, 293/110, 120, 122, 146, 148

(56) References Cited

U.S. PATENT DOCUMENTS

| | | | | |
|---|---|---|---|---|
| 4,652,032 A | * | 3/1987 | Smith | 293/120 |
| 5,080,412 A | * | 1/1992 | Stewart et al. | 293/120 |
| 5,306,058 A | * | 4/1994 | Sturrus et al. | 138/DIG. 11 |
| 5,425,561 A | * | 6/1995 | Morgan | 293/120 |
| 5,498,045 A | * | 3/1996 | Morgan et al. | 293/122 |
| 5,785,367 A | | 7/1998 | Baumann et al. | |
| 5,803,517 A | * | 9/1998 | Shibuya | 293/120 |
| 6,042,163 A | * | 3/2000 | Reiffer | 293/102 |
| 6,179,355 B1 | * | 1/2001 | Chou et al. | 188/377 |
| 6,349,521 B1 | * | 2/2002 | McKeon et al. | 293/102 |
| 6,352,297 B1 | * | 3/2002 | Sundgren et al. | 296/102 |
| 2001/0030432 A1 | * | 10/2001 | Mansoor et al. | 293/120 |
| 2001/0054827 A1 | * | 12/2001 | Sundgren et al. | 293/102 |
| 2002/0033610 A1 | | 3/2002 | Mori et al. | |

FOREIGN PATENT DOCUMENTS

| | | |
|---|---|---|
| DE | 44 01 865 A1 | 8/1994 |
| DE | 195 25 347 C1 | 7/1996 |
| DE | 195 11 868 A1 | 10/1996 |
| DE | 198 49 358 A1 | 5/2000 |
| DE | 198 54 185 A1 | 5/2000 |
| DE | 199 58 887 A1 | 6/2000 |
| DE | 101 41 922 A1 | 3/2002 |
| EP | 0 502 648 A1 | 9/1992 |
| JP | 10-81182 | 3/1989 |
| JP | 10-175485 | 6/1998 |

* cited by examiner

Primary Examiner—D. Glenn Dayoan
Assistant Examiner—Patricia L. Engle
(74) Attorney, Agent, or Firm—Burns, Doane, Swecker & Mathis, LLP

(57) ABSTRACT

A bumper reinforcement structure includes a bumper reinforcement element placed at least at the front end or rear end of a vehicle body and fixed to a side member of the vehicle body. The bumper reinforcement element has a closed hollow side cross-section, extends in the vehicle lateral direction and is formed of any one of a light alloy and a steel. A concave or convex portion is formed on at least one surface of the bumper reinforcement element so as to change the shape of the cross-section of the bumper reinforcement along the vehicle lateral direction.

17 Claims, 9 Drawing Sheets

BUMPER REINFORCEMENT STRUCTURE

This application is based on and claims priority under 35 U.S.C. §119 with respect to Japanese Application No. 2000-342314 filed on Nov. 9, 2000, the entire content of which is incorporated herein by reference.

FIELD OF THE INVENTION

The present invention generally relates to a vehicle bumper. More particularly, the present invention pertains to a bumper reinforcement structure in a vehicle bumper device for absorbing collision impact or energy upon the occurrence of a vehicle collision.

BACKGROUND OF THE INVENTION

An example of a known bumper device is disclosed in Japanese Patent Laid-Open Publication No. Hei.10(1998)-175485. This bumper device is positioned at the front and/or rear end of the vehicle body and includes a bumper reinforcement element secured to a side member of the vehicle body, an absorber member formed of an elastic material such as urethane and provided at the front region of the bumper reinforcement element, and a bumper cover member covering both the bumper reinforcement element and the absorber member.

As shown in FIGS. 9(a), 9(b) and 9(c), the bumper reinforcement element extends in the lateral direction of the vehicle and possesses a cross-section having a ⊟ shape when viewed in the lateral direction of the vehicle. The cross-sectional shape defines a rectangular outer profile with a crossing member dividing the cross-section in half. In light of space restrictions and improvements in the appearance of the vehicle body, the opposite ends of the bumper reinforcement element are curved so as to be accommodated in the bumper cover. This bumper reinforcement element is intended to absorb the collision impact upon the occurrence of a low speed vehicle collision to thus prevent damage or breakage of the vehicle body.

The material that is widely used to form the bumper reinforcement element is typically an aluminum alloy extruded material or a roll-formed steel (especially high tension steel). This material makes it possible to form the bumper reinforcement element into the cross-section noted above which is superior in collision impact absorption.

Recent developments in vehicle body appearance design have resulted in a narrowing of the space in which the bumper reinforcement element is to be accommodated. Thus, to mount the known bumper reinforcement element while maintaining the required impact absorption capability, it is necessary to make the shape of the bumper reinforcement element more complex. This requires relatively precise bending such as small-radius bending or complex bending, which involves a more complex production process and bending machine.

In addition, to reduce the likelihood of vehicle damage and passenger injury, while also lessening repair cost, the bumper reinforcement element should possess rather superior collision impact absorption capability. To address such a requirement, the bumper reinforcement element can be redesigned so that it is able to withstand higher loads. This can be achieved by, for example, forming file bumper reinforcement element with additional inner walls or with increased wall thickness. However, this undesirably increases the mass of the bumper reinforcement. In addition, the side member of the vehicle body to which the resulting bumper reinforcement element is secured has to be reinforced so as not to be deformed.

To address the foregoing problems, the aforementioned Japanese Patent Laid-Open Publication No. Hei.10(1998)-81182 proposes providing another separate impact absorption element at the bumper reinforcement element. However, such a proposal requires an additional production process for mounting the additional impact absorption element, thus resulting in an inevitable cost increase.

A need thus exists for a bumper reinforcement element that is able to address the aforementioned difficulties.

It would be desirable to provide a bumper reinforcement element that possesses a shape capable of being relatively easily formed, yet which is capable of fulfilling its function in a narrowed space as a result of the vehicle body appearance, which is able to absorb collision impacts in a lower load deformation region in which the side member fails to deform, and which is capable of being mass produced at a relatively low cost.

SUMMARY OF THE INVENTION

According to one aspect of the invention, a bumper reinforcement structure includes a bumper reinforcement element positioned at the front end and/or rear end of a vehicle body and fixed to a side member of the vehicle body. The bumper reinforcement element has a closed hollow cross-section and extends in the vehicular lateral direction. The bumper reinforcement element is formed of any one of a light alloy and a steel. A concave or convex portion is formed on at least one surface of the bumper reinforcement element to change the shape of the cross-section of the bumper reinforcement element along the vehicle lateral direction.

The bumper reinforcement structure of the present invention can be formed relatively easily even though the bumper reinforcement structure has a shape which performs its intended function when positioned in a narrowed space so as to make possible the desired vehicle body appearance.

Preferably, the concave portion or convex portion progressively changes in depth, width, and/or shape to change the shape of the cross-section of the bumper reinforcement element in the vehicle lateral direction. With such a construction, the load, which fails to deform the side member, does not change rapidly, thus making it possible to absorb the required collision impact or energy amount effectively.

The concave portion or convex portion can be formed at the vehicle lateral inner portion of the vehicular chassis or body side of the bumper reinforcement.

According to another aspect of the invention, a bumper reinforcement structure includes a bumper reinforcement element positioned at least at the front end or rear end of the vehicle body. The bumper reinforcement element has a portion fixed to a side member of the vehicle body, with such portion having an upper surface and a lower surface. At least one of the upper surface and the lower surface is formed with a bead portion which is at least either concave or convex and which extends in a direction transverse to the vehicle lateral direction. Such a structure increases the rigidity of the bumper reinforcement structure by not increasing the wall thickness of the bumper reinforcement element, thus making it possible to obtain a load vs. deformation amount curve possessing superior collision impact absorption attributes.

BRIEF DESCRIPTION OF THE DRAWING FIGURES

The foregoing and additional features of the present invention will become more apparent from the following detailed description considered with reference to the accompanying drawing figures in which like elements are designated by like reference numerals and wherein.

DETAILED DESCRIPTION OF THE INVENTION

Figure 1:
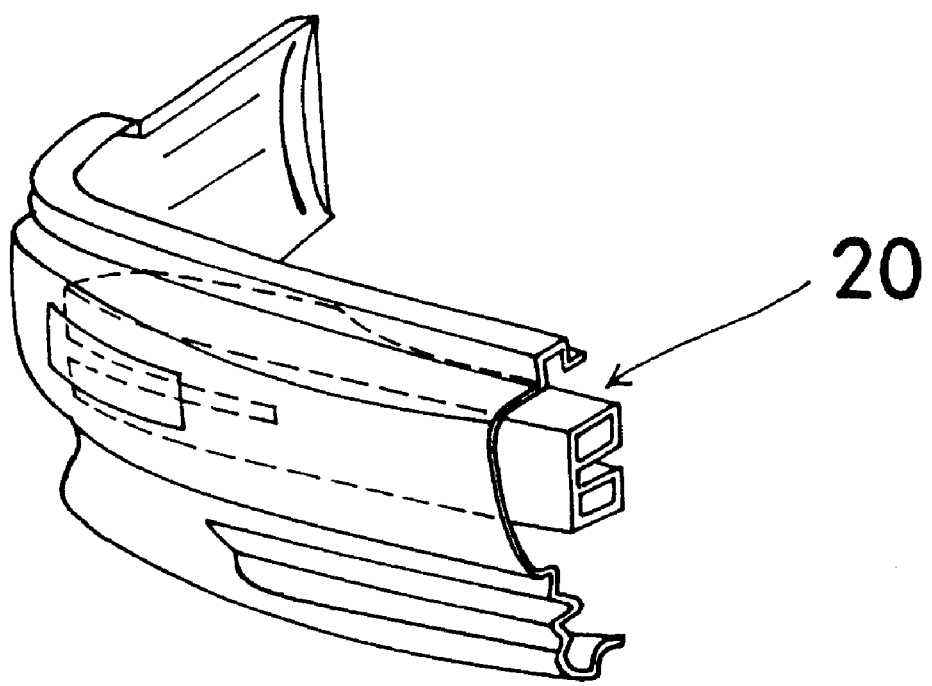
FIG. 1 is a perspective view of a bumper reinforcement structure mounted on a vehicle body that includes a bumper reinforcement element in accordance with a first embodiment of the present invention.
Figure 2A:
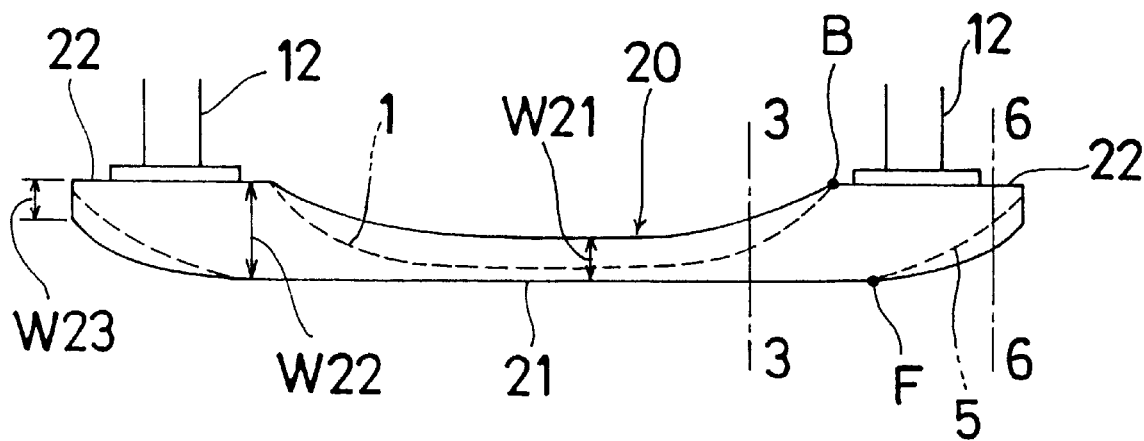
FIG. 2(a) is a top view of the bumper reinforcement element mounted on the vehicle body.
Figure 2B:
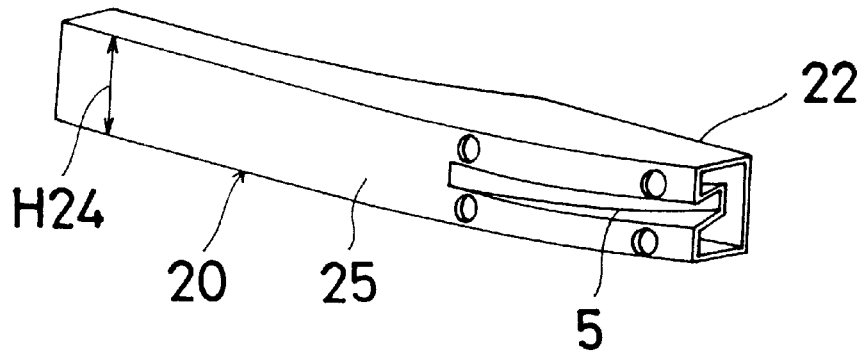
FIG. 2(b) is a perspective view of the vehicle lateral side of the bumper reinforcement element when viewed from its collision side.
Figure 2C:
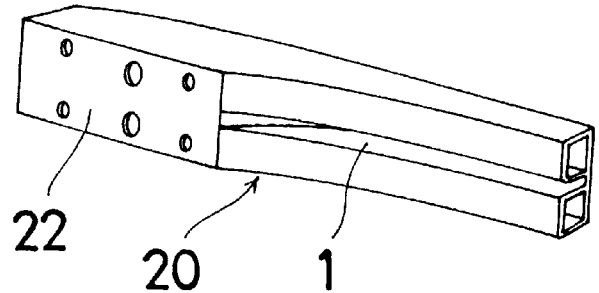
FIG. 2(c) is a perspective view of the vehicle lateral side of the bumper reinforcement element when viewed from its vehicle-body mounting side.

Referring initially to FIG. 1, FIG. 2(a) and FIG. 2(b), the bumper reinforcement structure according to the present invention includes a bumper reinforcement element 20 adapted to form part of an on-vehicle bumper device. The opposite ends of the bumper reinforcement element 20 form connecting portions 22, 22. Each of the connecting portions 22, 22 is connected to a respective one of the side member 12 of a vehicle body or chassis. Between the connecting portions 22, 22 of the bumper reinforcement element 20 (i.e., intermediate the connecting portions 22, 22), the bumper reinforcement element 20 possesses a swept or thinned configuration toward the vehicle body. In the illustrated embodiment, this is achieved by providing the intermediate portion with a slightly curved configuration. Thus, the width W21 (i.e., the dimension in the vehicle lengthwise direction) of the bumper reinforcement element 20 in the central lateral portion 21 of the bumper reinforcement element 20 is less than the width W22 of the bumper reinforcement element 20 at the connecting portion 22 when measured in the vehicle lengthwise direction. In addition, the bumper reinforcement element 20 possesses a height H24 as seen in FIG. 2(b).

Figure 3:
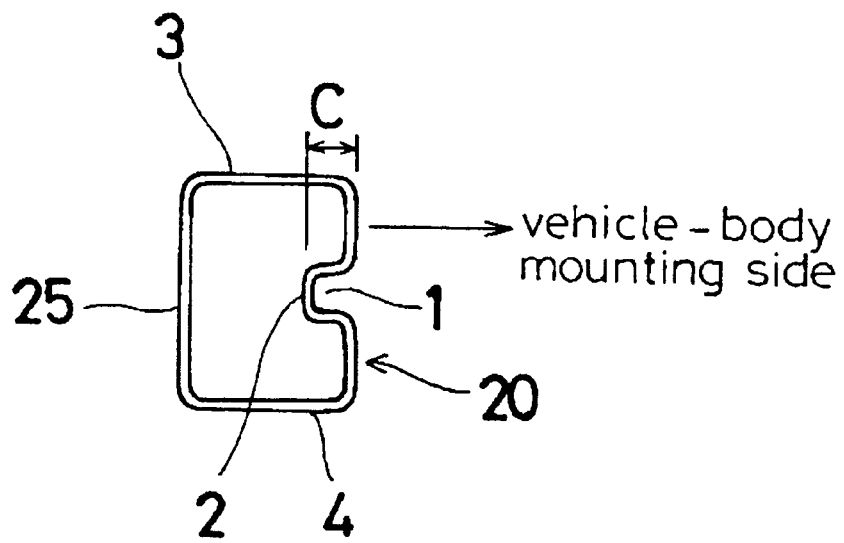
FIG. 3 is a cross-sectional view of the bumper reinforcement element taken along the section line 3—3 in FIG. 2(a)

The intermediate or thinned portion of the bumper reinforcement element 20 possesses a cross-section as seen in FIG. 3. The cross-section of the bumper reinforcement element 20 is defined by an upper wall 3, an oppositely located lower wall 4, a side wall 25 forming a collision side wall that receives the impact force upon the occurrence of a collision, and another side wall (vehicle chassis side wall) located in opposing relation to the collision side wall 25.

As shown in FIG. 3, the body side of the bumper reinforcement element 20 which opposes the vehicle chassis is formed with a concave, recessed or grooved portion 1 which extends relatively deeply into the cross-sectional interior of the bumper reinforcement element 20. The concave or grooved portion 1 has a bottom wall 2 which, beginning at the points designated B, is located at progressively further distances from the vehicle facing surface of the central portion 21. That is, the depth C of the grooved portion 1 becomes progressively larger toward the center portion 21 of the bumper reinforcement element 20. Thus, the depth of the grooved portion 1 is smallest at the ends of the grooved portion 1 designated B and progressively increases towards the central portion 21 of the bumper reinforcement element 20.

At the center portion 21 of the bumper reinforcement element 20, the bottom wall 2 of the grooved portion 1 can either contact or be spaced from the oppositely positioned collision side wall 25 of the bumper reinforcement element 20 forming a collision side wall.

In addition, as best shown in FIGS. 2(a) and 2(b), the opposite ends of the collision side wall 25 are curved backward or rearwardly and so the width W23 of each of the opposite ends of the bumper reinforcement element 20, as measured in the vehicle lengthwise direction, is smaller than the width W22 of the connecting portion.

Figure 6:
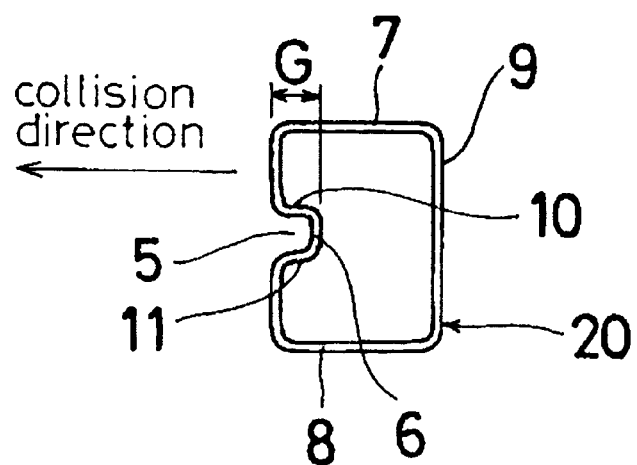
FIG. 6 is a cross-sectional view of the bumper reinforcement element taken along the section line 6—6 in FIG. 2(a)

Each end of the bumper reinforcement element 20 has a cross-section as shown in FIG. 6. As illustrated in FIG. 6, each end of the collision side wall 25 of the bumper reinforcement element 20 is formed with a concave, recessed or grooved portion 5 having a depth G. The depth G of the grooved portion 5 progressively increases toward the outermost side of the bumper reinforcement element 20 in the vehicle lateral direction. Thus, the depth G of each grooved portion 5 is smallest at the point F and progressively increases towards the outermost edge of the bumper reinforcement element 20. The bottom wall portion 6 of the grooved portion 5 can either contact or be spaced from the vehicular chassis side wall 9 of the bumper reinforcement element 20. In the illustrated version of present invention, and as seen from FIGS. 3 and 6, the cross-section of the bumper reinforcement element 20 is hollow and defines a closed configuration.

The bumper reinforcement element 20 can be formed by pressing aluminum alloy extruded materials and steel roll formed materials. More specifically, the central portion of a hollow-shaped base material member is prepared, with such base material member being in the form of any one of aluminum alloy extruded material or steel roll formed material. The base material member has a width W22 and a height H24, possesses a square cross-section, and includes opposite longitudinally extending surfaces. One of the longitudinally extending surfaces of the hollow-shaped base material member (i.e., one of the surfaces extending in the lateral width-wise direction of the vehicle) is subjected to a press formation to produce the grooved portion 1 at a center portion of the hollow-shaped base material member in such a manner that simultaneously the center portion is reduced in width in the vehicular lengthwise direction. In addition, the opposite ends of the other longitudinally extending surface of the hollow-shaped base material are pressed to form the respective grooved portions 5, 5 in such a manner that simultaneously each of the outermost end portions of the hollow-shaped base material member is reduced in width in the vehicular lengthwise direction. Thus, the bumper reinforcement element 20 can be produced relatively easily through the aforementioned press forming method.

Figure 4:
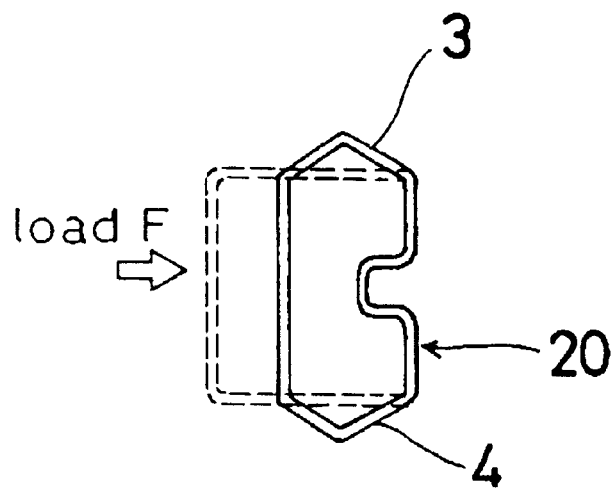
FIG. 4 is a cross-sectional view of the bumper reinforcement element illustrating how the element deforms at its center portion upon collision.

The bumper reinforcement element 20 having the features and characteristics described above operates in the following manner when a vehicle collision occurs. Referring to FIG. 4 which illustrates the deformation of the bumper reinforcement element 20 upon vehicle collision, when a load or collision impact having a magnitude F is applied to the collision side wall 25, initially the upper and lower walls 3, 4 of the bumper reinforcement element 20 buckle and are deformed.

Figure 5:
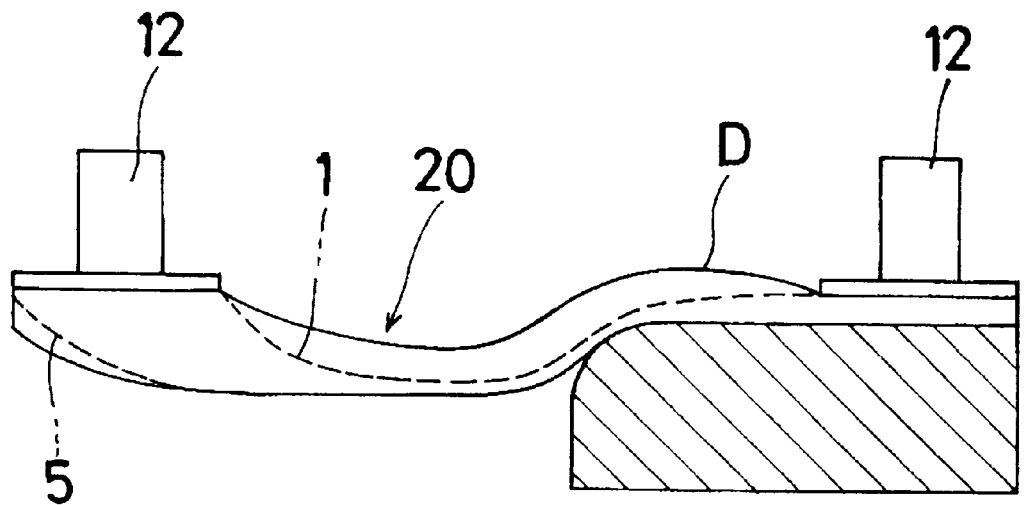
FIG. 5 is a top plan view of the bumper reinforcement element illustrating how the element deforms upon collision.

In view of the impact energy distribution in an actual vehicle collision such as an "offset collision" shown in FIG. 5, the resulting deformation is defined by a progressively bent deformation portion D on the bumper reinforcement element 20, thereby lowering the deformation load of the bumper reinforcement element 20. However, because the vehicular chassis side wall bumper reinforcement element 20 (i.e., the side wall of the bumper reinforcement element 20 facing the vehicle chassis or body) is provided with the grooved or recessed portion 1, the rigidity or surface rigidity of the vehicular chassis side of the bumper reinforcement element 20 is increased. This restricts the bent deformation of the bumper reinforcement element 20 which means that the lowering of the deformation load of the bumper reinforcement element 20 can be inhibited or prevented so the collision energy or impact absorption capability is increased.

Figure 7A:
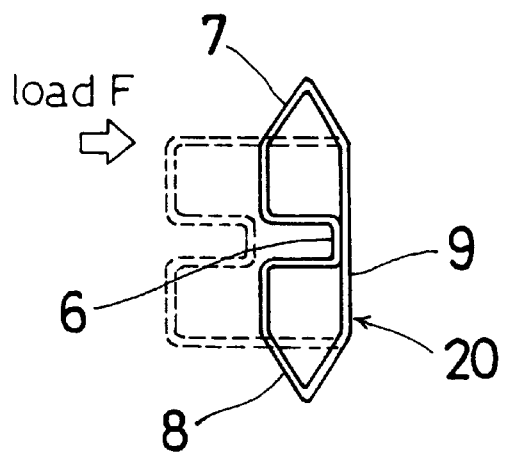
FIG. 7(a) is a cross-sectional view of the bumper reinforcement element illustrating how the element deforms at its side portion upon collision.
Figure 7B:
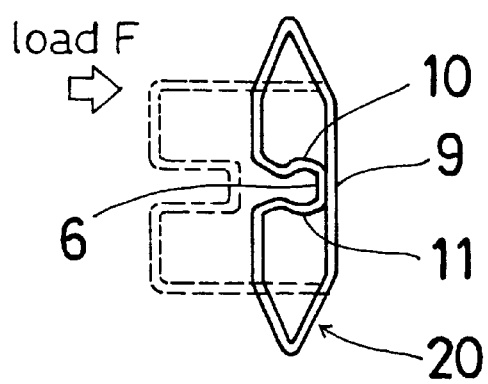
FIG. 7(b) is a cross-sectional view of the bumper reinforcement element illustrating how the element deforms at its side portion upon collision.

FIG. 7 shows a mode of the deformation of the bumper reinforcement element 20 upon the "offset collision" shown in FIG. 5. As can be easily understood from FIG. 7, when the collision side wall 25 is applied with a load or collision impact having a magnitude F, initially the upper and lower walls 7, 8 of the bumper reinforcement element 20 buckle and are deformed. Thereafter, only the upper wall 7 and the lower wall 8 continue to deform until the bottom wall portion 6 of the grooved portion 5 formed on the collision side wall 25 of the bumper reinforcement element 20 is brought into abutment or contact with the vehicle chassis side wall 9. After such an abutment of the collision side wall 25 with the chassis side wall 9, the upper and lower wall portions 10, 11 of the grooved portion 5 are also deformed.

At this stage, the depth G of the grooved portion 5 changes progressively in the vehicle lateral direction, which results in the deformation being transmitted from the outside toward the inside in the vehicle lateral direction. Thus, a stable load vs. deformation curve can be obtained which is free from a rapid change in load.

Figure 8:
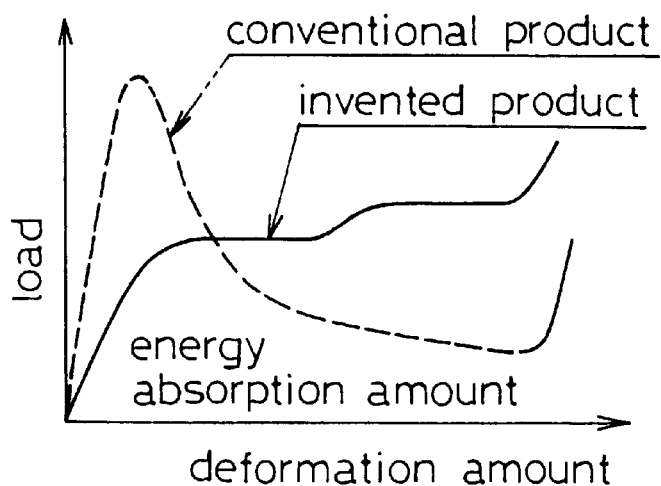
FIG. 8 is a graph illustrating a set of load vs. deformation curves comparing the deformation of the bumper reinforcement element of the present invention versus a known device under given loads.
Figure 9A:
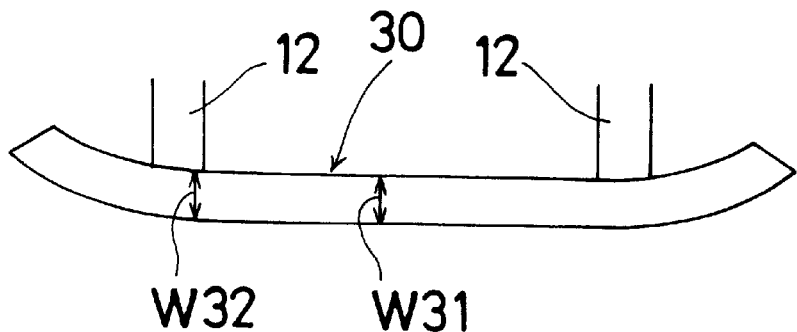
FIG. 9(a) is a top plan view of a known bumper reinforcement element mounted on the vehicle body.
Figure 9B:
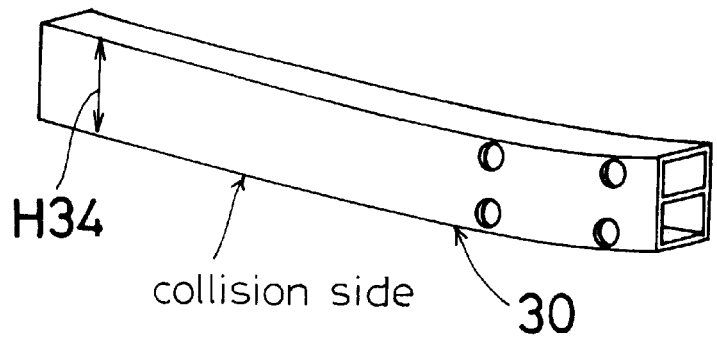
FIG. 9(b) is a perspective view of the vehicle lateral side of a known bumper reinforcement element when viewed from its collision side.
Figure 9C:
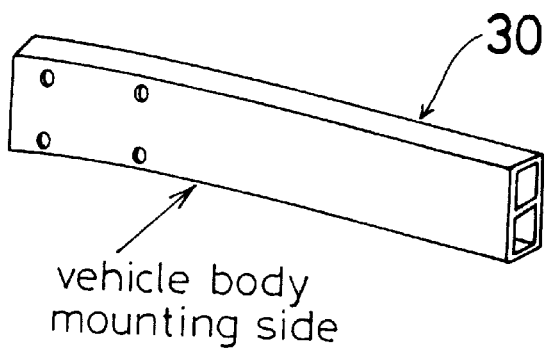
FIG. 9(c) is a perspective view of the vehicle lateral side of the known bumper reinforcement element when viewed from its vehicle-body mounting side.
Figure 10A:
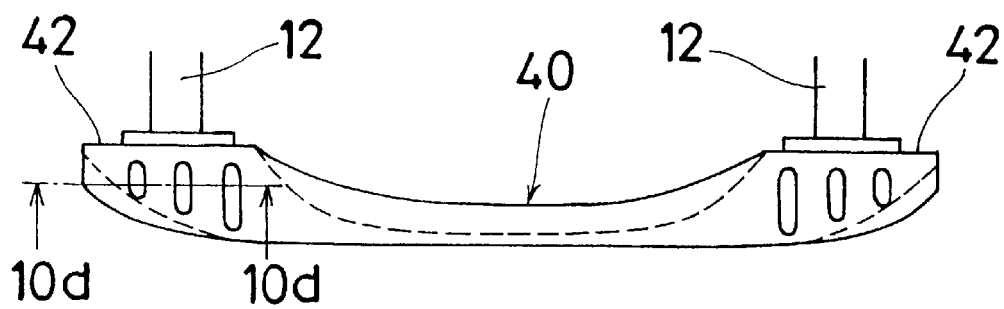
FIG. 10(a) is a top plan view of a bumper reinforcement element in accordance with a second embodiment of the present invention mounted on the vehicle body.
Figure 10B:
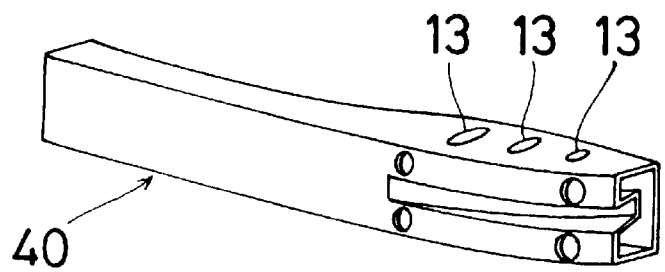
FIG. 10(b) is a perspective view of the vehicle lateral side of the bumper reinforcement element shown in FIG. 10(a) viewed from its collision side.
Figure 10C:
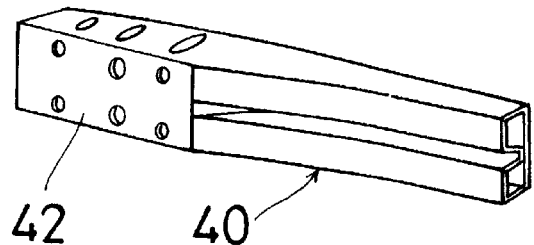
FIG. 10(c) is a perspective view of the vehicle lateral side of the bumper reinforcement element shown in FIG. 10(a) viewed from its vehicle-body mounting side.
Figure 10D:
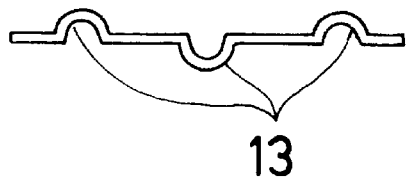
FIG. 10(d) is a cross-sectional view of the bumper reinforcement element shown in FIG. 10(a) taken along the section line 10d—10d FIG. 10(a)

FIG. 8 illustrates a load vs. deformation curve comparison between a known device and the bumper reinforcement element 20 according to the present invention. Each curve shows the amount of impact or energy absorption upon the occurrence of a vehicle collision as integrated values of the load and the deformation amount. As shown in FIG. 9, the known bumper reinforcement element 30 which is compared with the bumper reinforcement element 20 of the present invention possesses a ⊟ cross-section having a rectangular outer profile. The known bumper reinforcement element 30 extends in the vehicle lateral direction and terminates in curved portions at opposite ends. The known bumper reinforcement element 30 also has a width W31 in the vehicle lateral direction at a midpoint with respect to the vehicle lateral direction and a height H34. The width W31 and the height H34 of the known bumper reinforcement element 30 are set to be identical with the width W21 and the height H24 of the bumper reinforcement element 20, respectively, for correct comparison.

Because the known bumper reinforcement element 30 extends in the vehicle lateral direction such that the cross-section remains unchanged (i.e. the width W31 at the mid point in the vehicular lateral direction is identical with the width W32 at the portion of the bumper reinforcement element that is to be secured to the side member 12), to absorb the required amount of impact or energy upon collision, the known bumper reinforcement element 30 is reinforced by increasing the entire wall thickness of the bumper reinforcement element and/or adding an intermediate inner wall so that the known bumper reinforcement element 30 may deform at a higher load or impact.

In contrast, the bumper reinforcement element 20 of the present invention is configured such that the width W21 in the vehicle lengthwise direction at the central portion 21 (considered with reference to the vehicle lateral direction) is less than the width W22 at the connecting portions 22 (the width W22 is preferably approximately twice as large as the width W21). Thus, the deformation amount (stroke) can be prolonged, which means that a lower impact or load can deform the bumper reinforcement element 20 as compared to the known reinforcement element 30. In addition, the provision of each of the grooved portions 1, 5, 5 makes it possible to prevent an abrupt change in load, thereby establishing an effective impact or energy absorption.

The aforementioned bumper reinforcement element 20 in accordance with the first embodiment of the present invention is capable of being mounted in a limited or narrow space in the vehicle chassis, and is yet free from requiring a complex bending formation process and/or a complex production process. In addition, without increasing the entire wall thickness of the bumper reinforcement element 20 and/or adding another member to the bumper reinforcement element, the bumper reinforcement element 20 can nevertheless absorb collision impact or energy in such a manner that a load transferred to the side member 12 does not deform the side member 12.

Figure 11:
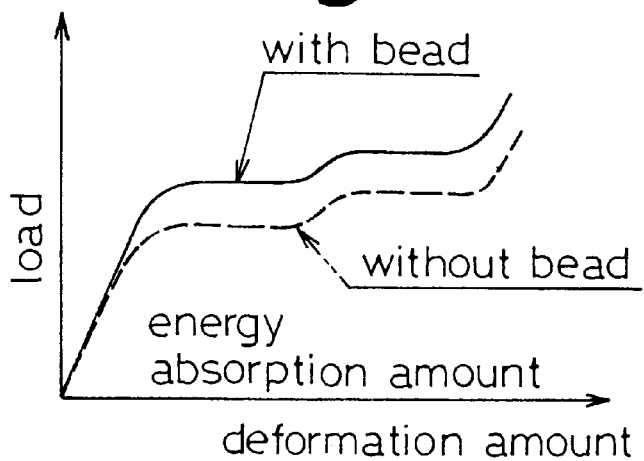
FIG. 11 is a graph illustrating a set of load vs. deformation curves comparing the deformation of the bumper reinforcement elements of the first and second embodiments of the present invention.

FIGS. 10(*a*), 10(*b*), 10(*c*) and 10(*d*) illustrate a bumper reinforcement element 40 according to a second embodiment of the present invention. The bumper reinforcement element 40 according to this second embodiment provides advantages derived from or similar to those associated with the bumper reinforcement element 20 according to the first embodiment. In addition, the bumper reinforcement element 40 according to the second embodiment possesses increased rigidity by virtue of being provided one or more concave or convex (rounded) bead portions 13 at the upper and/or lower surfaces of the bumper reinforcement element 40. The bead portion(s) 13 are positioned in the connecting portion 42 of the bumper reinforcement element 40 which is to be secured to the side member 12. The bead portion(s) 13 extend in a direction transverse to the vehicular lateral direction (i.e., generally parallel to the vehicle lengthwise direction). Thus, a load vs. deformation curve as shown in FIG. 11 can be obtained which provides further improved collision impact or energy absorption capabilities. It is to be understood that the illustrated bead(s) 13 are not restricted to the particular number and shape (i.e., cross section) shown in FIGS. 10(*a*)–(*d*).

Figure 12A:
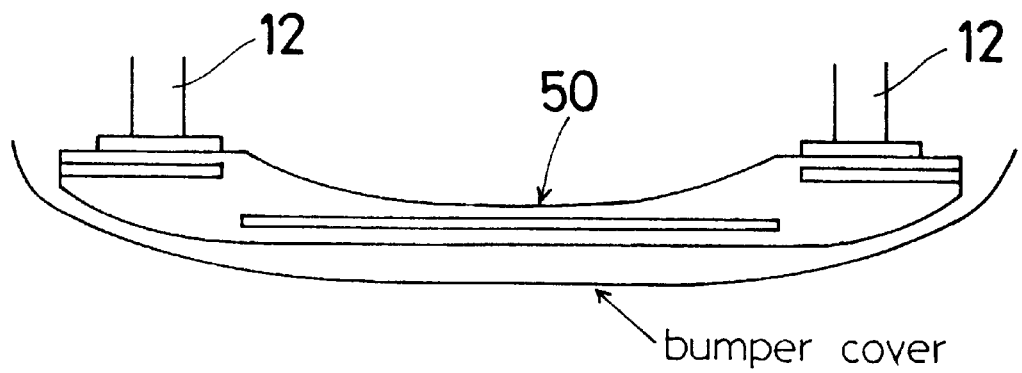
FIG. 12(a) is a top plan view of a bumper reinforcement element in accordance with a third embodiment of the present invention.
Figure 12B:
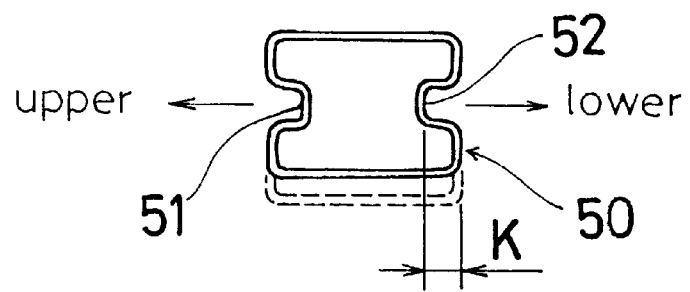
FIG. 12(b) is a side view of the bumper reinforcement element shown in FIG. 12(a)
Figure 13:
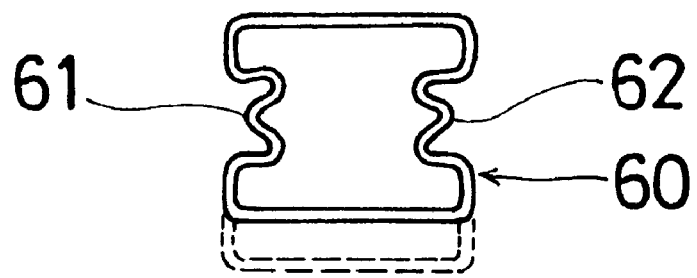
FIG. 13 is a side view of a bumper reinforcement element representing a modification of the bumper reinforcement element shown in FIG. 12(a)
Figure 14:
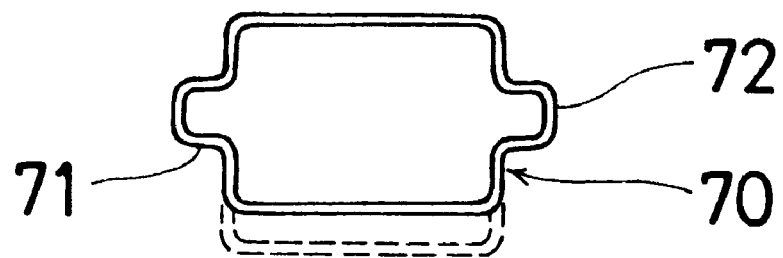
FIG. 14 is a side view of a bumper reinforcement element representing another modification of the bumper reinforcement element shown in FIG. 12(a).

FIGS. 12(*a*) and 12(*b*) illustrate a bumper reinforcement element 50 according to a third embodiment of the present invention. This third embodiment of the bumper reinforcement element 50 is provided at its upper and lower sides with respective concave portions (grooved or recessed portions) 51, 52 at the illustrated positions. As an alternative to the concave portions 51, 52 shown in FIG. 12(*b*), the bumper reinforcement element 60 can be provided with one or more concave portions (grooved or recessed portions) 61, 62 having a V-shaped bottom wall as shown in FIG. 13 rather than a flat bottom wall as shown in FIG. 12(*b*). As a further alternative, the bumper reinforcement element 70 can be provided with one or more convex portions 71, 72 as shown in FIG. 14. The convex portions 71, 72 form outwardly directed projections or outdented portions having a generally rectangular shape as seen in FIG. 14.

As described above, the present invention provides a bumper reinforcement structure which is well suited to being easily formed to produce the bumper reinforcement structure shaped to fulfill its function. In addition, the bumper reinforcement structure according to the present invention is able to absorb a collision impact within a low load deformation range in which the side member fails to deform. Further, the bumper reinforcement structure according to the present invention can be mass-produced and can be produced at a lower cost.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A bumper reinforcement structure comprising:

a bumper reinforcement element adapted to be placed at least at one of a front end and a rear end of a vehicle body and fixed to a side member of the vehicle body to extend in a lateral direction of the vehicle, the bumper reinforcement element having a closed, hollow cross-section and being formed of one of an aluminum alloy extruded material and a steel roll formed material; and a press-formed concave or convex portion formed on at least one surface of the bumper reinforcement element so that a shape of the cross-section of the bumper reinforcement element at the concave or convex portion is changed with respect to the lateral direction of the vehicle;

wherein the convex portion or concave portion includes a grooved portion formed in one side wall of the bumper reinforcement element, and including another grooved portion formed in an opposite side wall of the bumper reinforcement element.

2. The bumper reinforcement structure as set forth in claim 1, wherein the concave portion or the convex portion progressively changes in at least one of depth, width or shape to change the shape of the cross-section of the bumper reinforcement element with respect to the vehicle lateral direction.

3. The bumper reinforcement structure as set forth in claim 1, wherein the bumper reinforcement element includes a collision side adapted to face away from the vehicle body, the concave portion or the convex portion being formed at a lateral outer side of the collision side of the bumper reinforcement element.

4. The bumper reinforcement structure as set forth in claim 1, wherein the bumper reinforcement element includes a vehicle chassis side that is adapted to face towards the vehicle body, the concave portion or the convex portion being formed at a lateral inner portion of the vehicular chassis side of the bumper reinforcement element.

5. The bumper reinforcement structure as set forth in claim 1, wherein the convex portion or concave portion is a grooved portion formed in one side wall of the bumper reinforcement element.

6. The bumper reinforcement structure as set forth in claim 5, wherein the grooved portion possesses a depth that varies.

7. The bumper reinforcement structure as set forth in claim 1, wherein the convex portion or concave portion includes a first grooved portion formed in one side wall of the bumper reinforcement element, and including two second grooved portions formed in an opposite side wall of the bumper reinforcement element.

8. The bumper reinforcement structure as set forth in claim 7, wherein the second grooved portions are located at opposite end portions of the bumper reinforcement element, the first grooved portion being located at an intermediate portion of the bumper reinforcement element that is located between the end portions.

9. A bumper reinforcement structure comprising:

a bumper reinforcement element adapted to be placed at least at one of a front end and a rear end of a vehicle body, the bumper reinforcement element having a portion that is adapted to be fixed to a side member of the vehicle body, the portion having an upper surface and a lower surface; and at least one of the upper surface and the lower surface of the portion of the bumper reinforcement element being formed with at least one bead portion which is concave or convex and which is oriented in a direction transverse to a lengthwise extent of the bumper reinforcement element;

wherein the bumper reinforcement element includes a collision side adapted to face away from the vehicle body, the concave portion or the convex portion being formed at a lateral outer side of the collision side of the bumper reinforcement element.

10. The bumper reinforcement structure as set forth in claim 9, wherein the at least one bead portion has a rounded shape.

11. The bumper reinforcement structure as set forth in claim 9, including a plurality of spaced apart bead portions.

12. The bumper reinforcement structure as set forth in claim 9, including a plurality of bead portions positioned at one end portion of the bumper reinforcement element and a plurality of bead portions positioned at an opposite end portion of the bumper reinforcement element.

13. The bumper reinforcement structure as set forth in claim 9, wherein the at least one bead portion includes at least one convex bead portion and at least one concave bead portion positioned at the portion of the bumper reinforcement element.

14. A bumper reinforcement structure comprising:

a bumper reinforcement element adapted to be placed at least at one of a front end and a rear end of a vehicle body and fixed to a side member of the vehicle body to extend in a lateral direction of the vehicle, the bumper reinforcement element having a closed, hollow cross-section and being formed of one of a light alloy and a steel; and a concave or convex portion formed on at least one surface of the bumper reinforcement element so that a shape of the cross-section of the bumper reinforcement element at the concave or convex portion is changed in the lateral direction of the vehicle relative to an adjoining portion of the bumper reinforcement element, the bumper reinforcement element including a vehicle chassis side that is adapted to face towards the vehicle body, the concave portion or the convex portion being formed at a lateral inner portion of the vehicular chassis side of the bumper reinforcement element;

wherein the concave portion or the convex portion includes a grooved portion formed at a lateral inner portion of the vehicular chassis side of the bumper reinforcement element so that a width in the vehicle lengthwise direction at a lateral inner portion is less than a width at a lateral outer portion.

15. The bumper reinforcement structure as set forth in claim 14, wherein the convex portion or concave portion includes a grooved portion formed in one side wall of the bumper reinforcement element, and including another grooved portion formed in an opposite side wall of the bumper reinforcement element.

16. The bumper reinforcement structure as set forth in claim 14, wherein the convex portion or concave portion includes a first grooved portion formed in one side wall of the bumper reinforcement element, and including two second grooved portions formed in an opposite side wall of the bumper reinforcement element.

17. The bumper reinforcement structure as set forth in claim 16, wherein the second grooved portions are located at opposite end portions of the bumper reinforcement element, the first grooved portion being located at an intermediate portion of the bumper reinforcement element that is located between the end portions.

* * * * *